THRESHOLD CIRCUIT FOR TONE-RINGER OR LIKE LOAD MEANS

Original Filed Sept. 12, 1972

United States Patent Office

Re. 28,283
Reissued Dec. 24, 1974

28,283
THRESHOLD CIRCUIT FOR TONE-RINGER OR LIKE LOAD MEANS

Michael C. J. Cowpland and Richard C. Foss, Ottawa, Ontario, Canada, assignors to Microsystems International Limited, Montreal, Quebec, Canada Original No. 3,772,470, dated Nov. 13, 1973, Ser. No. 288,410, Sept. 12, 1972. Application for reissue Feb. 4, 1974, Ser. No. 439,065
Claims priority, application Canada, July 24, 1972, 147,766
Int. Cl. H04m *1/00*
U.S. Cl. 179—84 T 11 Claims

Matter enclosed in heavy brackets [ ] appears in the original patent but forms no part of this reissue specification; matter printed in italics indicates the additions made by reissue.

ABSTRACT OF THE DISCLOSURE

The present invention relates to a threshold circuit for connection between the terminals of a power-supply and a load—particularly a tone-ringer for use in a station-set of a telephone or like data-transmission system. The circuit is used to switch between a dummy load and a main load—such as a tone-ringer—wherein the dummy load normally takes lesser current draw than the main load. Therefore, for a given power-supply impedance, the voltage drop across the power-supply lines will increase and in conventional circuits this reduces the voltage level below the threshold, causing parasitic oscillation. The present invention eliminates this problem by providing hysteresis in the threshold voltage by use of a positive feedback network, so that the dummy load will not be switched in again until the power-supply voltage is considerably less than the original threshold voltage level.

The present invention relates to a threshold circuit for connection between the terminals of a power supply and a load—particularly a tone-ringer for use in a station set of a telephone or like data-transmission system.

Tone ringers for standard telephone systems must operate off the same ringing voltage as a conventional telephone bell. For North American systems, this voltage is typically 88 volts A.C. at 20 Hz., similar voltages and frequencies being commonly employed in other systems throughout the world. Two sources of spurious signals which can trigger a tone-ringer into operation are switchhook transients and the pulses caused by rotary dials. The problem is particularly serious on short telephone loops where the inductance of the central office relays can cause large voltage transients under pulsing conditions.

Therefore, some kind of threshold circuit is desirable to ensure that the tone-ringer will not respond to spurious signals. Conventionally, the A.C. power supply signal is full-wave rectified and the D.C. output from the rectifier stored in a capacitor. The threshold voltage of the capacitor is selected to be higher than the voltage caused by spurious signals on the telephone line, and is typically about 17 volts. Until this threshold value is reached, a dummy load is placed in circuit across the capacitor to discharge any spurious charge thereon caused by rotary dial transients, etc. When the threshold voltage is reached, it is desirable to remove the dummy load completely to avoid excessive power consumption through the lines. This is important from the viewpoint of maximizing the number of tone-ringers which can be powered in parallel by the system. Also, the maximum number of parallel tone-ringers that can be used is constrained by the operating current required by them and, hence, the power drain of the dummy loads also constrain the maximum number which can be used. Thus, it is obviously desirable that the dummy load as well as the tone-ringer should draw as little current as possible and the dummy load clearly should not draw more current than the tone-ringer.

Now, examine the case where the tone-ringer draws about 2.5 milliamps of current (typical) and the dummy load, say, 2 milliamps. When the threshold voltage is reached for the tone-ringer, the tone-ringer is energized and the dummy load is switched out of circuit. Now the current draw rises to 2.5 milliamps—a rise of 0.5 milliamps. Assuming a source impedance (telephone line, etc.), of about 8 Kohms, this rise gives an extra voltage drop of 4 volts, reducing the voltage level below the threshold and causing parasitic oscillation.

The present invention avoids this problem by arranging hysteresis in the threshold voltage by use of a positive feedback network. Thus, when the dummy load switches over to the tone-ringer, the threshold level drops so that the voltage drop due to the extra current draw by the tone-ringer still does not pull the operating voltage down to the threshold level which would otherwise cause the dummy load to be switched in again and thus give rise to the parasitic oscillation condition.

According to the present invention there is provided a threshold circuit for energizing from a D.C. power supply source a first load means having first and second terminals, said circuit comprising a dummy load switchably interconnected across third and fourth terminals for connection to said power supply source when said load means is disconnected therefrom, said dummy load having fifth and sixth terminals and adapted to draw less current than said said first load means, whereby the potential difference between said third and fourth terminals is greater by a value $V_1$ with said dummy load operatively connected therebetween than with said first load means so connected for a given power supply impedance, said fifth terminal connected to said fourth terminal of said power supply source and said sixth terminal connected through a first controllable switch means to the control element of a second controllable switch means, the control element of said first controllable switch means connected through said second controllable switch means to said third terminal, a fourth controllable switch means between said first terminal of said first load means and said third terminal, the control element of said fourth controllable switch means connected to the control element of said first controllable switch means and through a third controllable switch means to said fourth terminal, voltage threshold means comprising first and second series connected portions thereof and having a threshold value $V_2$, connected between said third terminal and the control element of said third controllable switch means, said second portion being connected to said control element of said third controllable switch means, and unidirectional current passing means connecting the junction between said first and second portions of said threshold means to said first terminal of said first load means and said third terminal, current flow between said first terminal of said first load means and said third terminal when said fourth controllable switch means is disabled, said second terminal of said first load means being connected to said fourth terminal, whereby a current path is established between said third terminal and said control element of said third controllable switch means enabling said third controllable switch means when the potential difference between said third and fourth terminals reaches said threshold value $V_2$, the breakdown voltages of said unidirectional current passing means and said second portion of said threshold means being such as to pass enabling current to the control element of said third controllable switch means when said fourth controllable switch means is enabled and the potential difference between said third and fourth terminals is within the range of values from $(V_2-V_1)$ or lower to $V_2$.

In a preferred embodiment of the invention each of said controllable switch means is a bipolar transistor and said unidirectional current passing means is a diode.

In yet a further embodiment of the invention, said first load means is a tone-ringer.

The invention will now be described further by way of example only and with reference to the accompanying drawings wherein.

Figure 1:
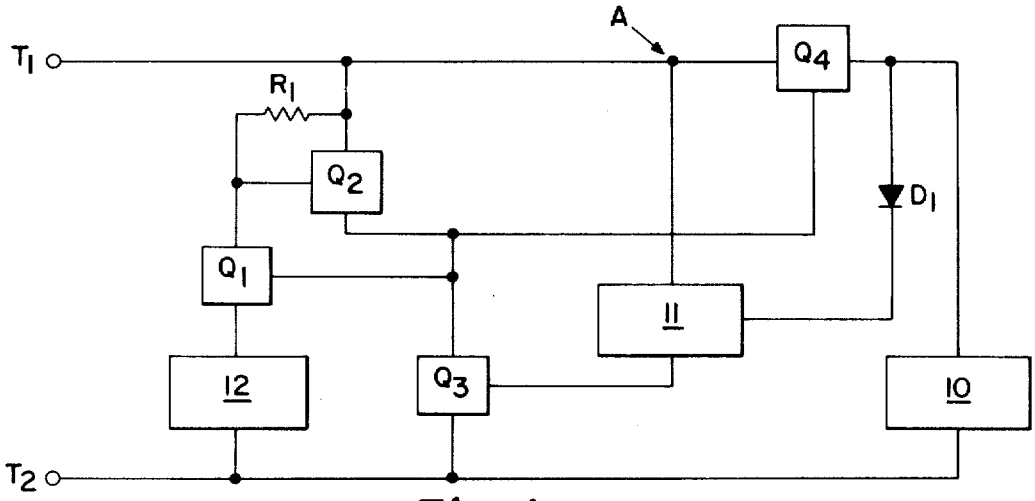
FIG. 1 is a block diagram of a threshold circuit according to the invention.

Referring now to the drawings, and in particular to FIG. 1 thereof, the threshold circuit comprises input terminals $T_1$ and $T_2$ for connection to a power-supply. Although such power-supply is not shown in FIG. 1, it commonly includes a capacitor across which terminals $T_1$ and $T_2$ are connected and which is charged by an input supply.

For the purposes of explanation, current is assumed to flow from $T_1$ to $T_2$ (positive to negative), and the nomenclature applied to the circuit elements is formulated accordingly. Of course, if current flow is assumed to flow from $T_2$ to $T_1$, the following description is applicable with transposition of nomenclature such as "input" and "output," etc. The load 10 is connected at one side to terminal $T_2$ and at the other side to the output terminal of a switch means $Q_4$. The switch means $Q_4$ and each of the other switch means of the circuit may be a bipolar transistor—which is preferred—a field-effect transistor or a vacuum tube. The circuit will have appropriate impedance matching means—and auxiliary power-supply means, where required—for the particular type of switch means selected, such requirements being readily ascertainable to those skilled in the art from a consideration of the basic circuit of the invention. Across the terminals $T_1$ and $T_2$ there is connected a dummy-load 12 which is series connected with the terminals of a switch means $Q_1$ and the junction between the control electrode and input terminal of a switch means $Q_2$, this junction being denoted by the resistance $R_1$. The output terminal of $Q_2$ and the control electrode of $Q_1$ are interconnected and are also connected to the control electrode of $Q_4$ and to the input terminal of a switch means $Q_3$, the output terminal of which is connected to $T_2$. The control electrode of $Q_3$ is connected to the input terminal of $Q_4$ through a threshold means 11. The threshold means 11 is partially by-passed by a unidirectional current passing means—shown as a diode $D_1$—across the switch means $Q_4$. The threshold means 11 preferably comprises series diodes—conveniently Zener diodes—to the junction between which the connection to diode $D_1$ is made.

The circuit operates as follows. When the voltage across terminals $T_1$ and $T_2$ is less than the threshold voltage for the circuit, the threshold means 11 prevents enabling potential from reaching the control electrode of switch means $Q_3$. Now, noise spikes at the control electrodes of $Q_1$ and $Q_2$ cause these switches to saturate and effectively function as a thyristor, clamping the dummy load 12 to terminal $T_1$, less the small potential drop across resistance $R_1$. The diode $D_1$ is effective to block current flow from terminal $T_1$ through the threshold means 11 to the load 10 when $Q_4$ is disabled.

When the voltage between $T_1$ and $T_2$ reaches the threshold voltage, the threshold means 11 conducts and applies an enabling potential to $Q_3$. Now potential from the control electrode of $Q_1$ is drained through $Q_3$, disabling $Q_1$ and $Q_2$. Switch means $Q_4$, deriving enabling potential from the negative terminal $T_2$ through switch means $Q_3$ is now enabled, thus connecting the load 10 across terminals $T_1$ $T_2$ and noise spikes at the bases of $TR_1$ and $TR_2$ quickly passed by current flowing through the diode $D_1$, thereby reducing the effective threshold voltage for the circuit and providing the required hysteresis.

Figure 2:
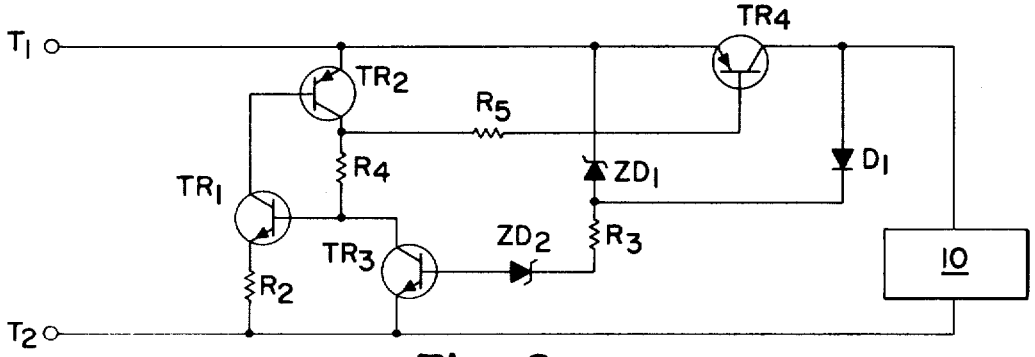
FIG. 2 is a schematic diagram of a threshold circuit according to a further embodiment of the invention.

As stated above, the most convenient manner of realizing the circuit of the invention is by use of bipolar transistors. A simple circuit according to the invention utilizing such devices is shown in FIG. 2. A comparison of the respective circuit elements of FIG. 1 with those of FIG. 2 will quickly reveal the following equivalents:

| FIG. 1: | FIG. 2: |
|---|---|
| $Q_1$, $Q_2$, $Q_3$, $Q_4$ | $TR_1$, $TR_2$, $TR_3$, $TR_4$ |
| $R_1$ | Base-emitter junction of $T_2$ |
| **12** | $R_2$ |
| **11** | $ZD_1$, $ZD_2$, $R_3$ |

Also included in the circuit are impedance matching resistors $R_4$ and $R_5$, each connected to the collector of $TR_2$ and respectively to the base of $TR_1$ and to the base of $TR_4$. The diode $D_1$ is connected to the junction of $ZD_1$ and $R_3$. The operation of the circuit of FIG. 2 is entirely analogous to that of FIG. 1 and is as follows.

When the voltage across $T_1$ and $T_2$ is less than the threshold voltage for the circuit, the threshold means, constituted by $ZD_1$, $R_3$ and $ZD_2$ does not conduct, and insufficient potential appears at the base of $TR_3$ to enable $TR_3$. Therefore, the base of $TR_1$ is located from terminal $T_2$ and noise spikes at the bases of $TR_1$ and $TR_2$ quickly cause these transistors to saturate. In this condition, resistor $R_2$ is placed in circuit across terminals $T_1$ and $T_2$, and the end thereof connected to the emitter of $TR_1$ is clamped to the potential of $T_1$ minus the diode drop across the base-emitter junction of $TR_2$.

When the voltage rises above the threshold value for the circuit, $ZD_1$ and $ZD_2$ break down and the threshold means conducts, applying potential to the base of $TR_3$, enabling $TR_3$. Now, charge is drained from the base of $TR_1$ to terminal $T_2$, disabling $TR_1$ and $TR_2$ and effectively disconnecting $R_2$ from the circuit. With $TR_3$ now conducting, and $TR_2$ disabled, charge from terminal $T_2$ is applied to the base of $TR_4$, enabling $TR_4$ and connecting the load 10 across the terminals $T_1$ and $T_2$. With $TR_4$ conducting, a current path is also established through $D_1$ bypassing $ZD_1$ and effectively lowering the threshold of the voltage applied to the base of $TR_3$ by a Zener diode drop $ZD_1$ minus the drop across diode $D_1$. It should be noted in this connection that the primary purpose of $D_1$ is as a unidirectional current passing device but that it is usefully employed also as a breakdown device and for this purpose a Zener diode can equally well be substituted.

Thus the effective threshold voltage for the circuit is reduced, giving the required hysteresis. If the threshold voltage for the circuit is $V_2$ and the required hysteresis is $V_1$, to prevent parasitic oscillation, transistor $TR_3$ must remain enabled over the range of voltages from $(V_2-V_1)$ to $V_2$. Normally, the hysteresis is set to be slightly greater than $V_1$ to provide for circuit parameter fluctuations and, therefore, diode $D_1$ and Zener diode $ZD_1$ are set to break down at a level slightly lower than $(V_2-V_1)$.

Figure 3:
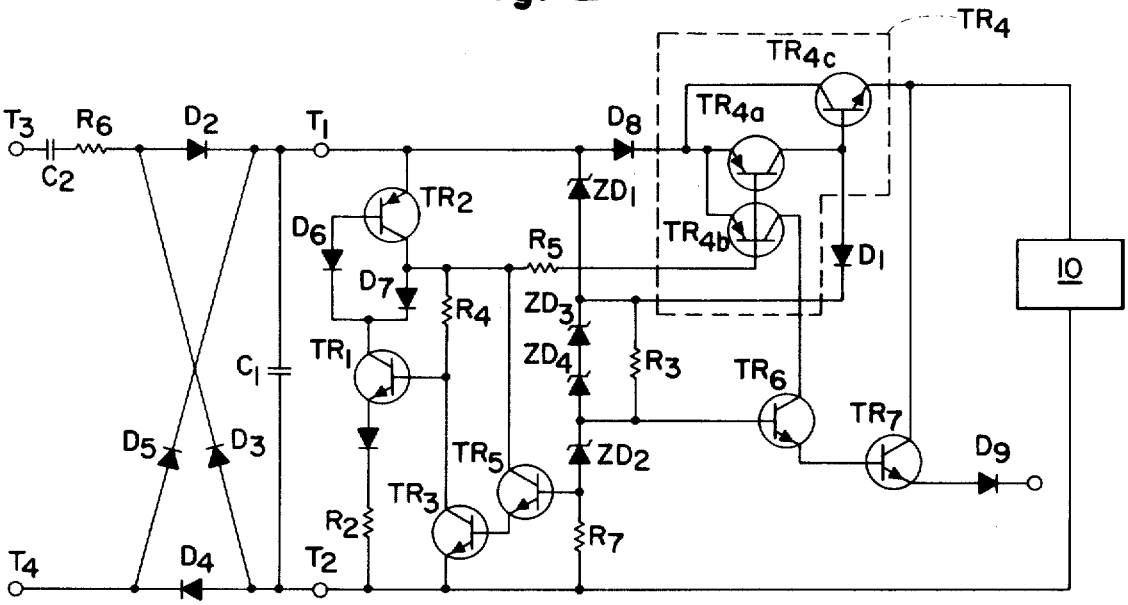
FIG. 3 is a schematic diagram of a threshold circuit according to yet a further embodiment of the invention.

FIG. 3 shows a circuit according to a further embodiment of the invention, particularly suitable for fabrication by integrated circuit technology. The elements of FIG. 2 appear in FIG. 3 and are designated by like numerals and lettering in both Figures.

The input to terminals $T_1$ and $T_2$ is derived from an alternating current supply—for example a telephone line—through terminals $T_3$ and $T_4$ and a full-wave bridge rectifier. The full-wave rectifier comprises diodes $D_2$ to $D_5$ inclusive and a storage capacitor $C_1$ is placed across terminals $T_1$ and $T_2$. The charge on $C_1$ effectively comprises the D.C. power supply for the threshold circuit. A coupling capacitor $C_2$ is placed in series with an impedance matching resistor $R_6$ between terminal $T_3$ and the junction of diodes $D_2$ and $D_3$ in order to prevent D.C. current drain on the line.

Instead of the base electrode of $TR_2$ being directly connected to the collector electrode of $TR_1$, such connection is made through a diode $D_6$. Also, the collector electrode of $TR_2$ is connected to the collector electrode of $TR_1$ through a diode $D_7$. Diodes $D_6$ and $D_7$ prevent $TR_2$ from saturating. If saturation were allowed to occur, parasitic PNP action to the integrated circuit substrate could arise.

In place of single transistor $TR_4$ as shown in FIG. 2 the circuit of FIG. 3 employs a multiple transistor arrangement designated generally as $TR_4$ and comprising transistors $TR_{4a}$, $TR_{4b}$, and $TR_{4c}$. Transistor $TR_{4a}$ functions as transistor $TR_4$ in FIG. 2 and transistor $TR_{4c}$ acts as a buffer to provide the main power supply current to the load. The function of transistor $TR_{4b}$ will be explained below.

Diode $D_8$ is inserted between terminal $T_1$ and the emitter of $TR_{4a}$ and functions to ensure that $TR_{4a}$ and $TR_{4b}$ are disabled when $TR_2$ is on but held out of saturation by $D_6$ and $D_7$.

Zener diodes $ZD_3$ and $ZD_4$ are inserted across resistor $R_3$ and serve to protect capacitor $C_1$ from excessive voltages by clamping it to an appropriate maximum value.

Transistor $TR_5$ is connected between the base electrode of $TR_3$ and the collector of $TR_2$ and functions as a buffer for $TR_3$. Resistor $R_7$ connected between the base of $TR_5$ and terminal $T_2$ sinks leakage current through the Zener diode train to terminal $T_2$.

The circuit comprising transistors $TR_{4b}$, $TR_6$ and $TR_7$ and diode $D_9$ functions to provide a low-voltage regulated power supply at terminal $T_5$, which is particularly convenient for operating various functions with which the circuit is associated. For example, if the circuit were used with an electronic tone-generator in a telephone or like data-transmission station-set, such low voltage power supply would be useful for operating the tone-generating portions of the circuit.

Various alternatives and modifications to the embodiments disclosed herein will be readily apparent to those skilled in the art without departing from the spirit and scope of the invention as described by the disclosure and defined by the claims appended hereto.

What is claimed is:

1. A threshold circuit for energizing from a D.C. power supply source a first load means having first and second terminals, said circuit comprising a dummy load switchably interconnected across third and fourth terminals for connection to said power supply source when said load means is disconnected therefrom, said dummy load having fifth and sixth terminals and adapted to draw less current than said first load means, whereby the potential difference between said third and fourth terminals is greater by a value $V_1$ with said dummy load operatively connected therebetween than with said first load means so connected for a given power supply impedance, said fifth terminal connected to said fourth terminal of said power supply source and said sixth terminal connected through a first controllable switch means to the control element of a second controllable switch means, the control element of said first controllable switch means connected through said second controllable switch means to said third terminal, a fourth controllable switch means between said first terminal of said first load means and said third terminal, the control element of said fourth controllable switch means connected to the control element of said first controllable switch means and through a third controllable switch means to said fourth terminal, voltage threshold means comprising first and second series connected portions thereof and having a threshold value $V_2$, connected between said third terminal and the control element of said third controllable switch means, said second portion being connected to said control element of said third controllable switch means, and unidirectional current passing means connecting the junction between said first and second portions of said threshold means to said first terminal of said first load means and adapted to block current flow between said first terminal of said first load means and said third terminal when said fourth controllable switch means is disabled, said second termnial of said first load means being connected to said fourth terminal, whereby a current path is established between said third terminal and said control element of said third controllable switch means enabling said third controllable switch means when the potential difference between said third and fourth terminals reaches said threshold value $V_2$, the breakdown voltages of said unidirectional current passing means and said second portion of said threshold means being such as to pass enabling current to the control element of said third controllable switch means when said fourth controllable switch means is enabled and the potential difference between said third and fourth terminals is within the range of values from $(V_2-V_1)$ or lower to $V_2$.

2. The threshold circuit of claim 1 wherein each of said controllable switch means is a bipolar transistor.

3. The threshold circuit of claim 1 wherein each of said first and second portions of said voltage threshold means includes a voltage breakdown device comprising a diode means.

4. The threshold circuit of claim 3 wherein each of said diode means is a Zener diode.

5. The threshold circuit of claim 1 wherein said unidirectional current passing means is a diode.

6. A threshold circuit for energizing from a D.C. power supply source a first load means having first and second terminals, said circuit comprising a dummy load switchably interconnected across third and fourth terminals for connection to said power supply source when said load means is disconnected therefrom, said dummy load having fifth and sixth terminals and adapted to draw less current than said first load means, whereby the potential difference between said third and fourth terminals is greater by a value $V_1$ with said dummy load operatively connected therebetween than with said first load means so connected for a given power supply impedance, said fifth terminal connected to said fourth terminal of said power supply source and said sixth terminal connected through a first transistor to the base electrode of a second transistor, the base electrode of said first transistor connected through said second transistor to said third terminal, a fourth transistor between said first terminal of said first load means and said third terminal, the base electrode of said fourth transistor connected to the control element of said first transistor and through a third transistor to said fourth terminal, voltage threshold means comprising first and second series connected portions thereof and having a threshold value $V_2$, each of said first and second series connected portions including a Zener diode connected between said third terminal and the base electrode of said third transistor, said second portion being connected to said base electrode of said third transistor, and diode means connecting the junction between said first and second portions of said threshold means to said first terminal of said first load means and adapted to block current flow between said first terminal of said first load means and said third terminal when said fourth transistor is disabled, said second terminal of said first load means being connected to said fourth terminal, whereby a current path is established between said third terminal and said base electrode of said third transistor enabling said third transistor when the potential difference between said third and fourth terminals reaches said threshold value $V_2$, the breakdown voltages of said diode means and said second portion of said threshold means being such as to pass enabling current to the base electrode of said third transistor when said fourth transistor is enabled and the potential difference between said third and fourth terminals is within the range of values from $(V_2-V_1)$ or lower to $V_2$.

7. The threshold circuit of claim 6 wherein said first load means comprises a tone-ringer for a station-set and said D.C. power supply source is derived through rectifying means from an alternative current energized telephone or data-transmission line.

*8. A threshold circuit for energizing a first load from a direct current power supply source of varying voltage comprising:*

*(a) means connected across said source, and to a dummy load, for energizing the dummy load at power supply voltages below a predetermined threshold level,*

*(b) switch means connected to said source and to said first load for connecting said first load to said source when activated, at power supply voltages above said predetermined threshold level,*

*(c) means within the (a) means for simultaneously disconnecting said dummy load and, at the same time, activating said switch means, at power supply voltages above said predetermined threshold level, and*

*(d) means connected between the (a) means and the switch means for reducing the voltage of said threshold level upon actuation of said switch means.*

*9. A threshold circuit as defined in claim 8, in which the (d) means comprises a nonlinear network connected to said source adapted to draw current and activate the (c) means at power supply voltages in excess of the predetermined threshold level, and to draw current and continue to activate the (c) means at reduced power supply voltages once the switch means has operated.*

*10. A threshold circuit as defined in claim 9 in which the nonlinear network comprises a pair of series connected Zener diodes which has a combined conduction voltage substantially equal to said predetermined threshold level,*

*one of said Zener diodes having a first terminal connected to a supply terminal and a second terminal connected to the other of said Zener diodes; and in which said switch means comprises the emitter-collector circuit of a transistor activatable by its emitter, connected between the power supply terminal to which said first terminal of said one of the Zener diodes is connected and the first load, further comprising a diode connected between the collector terminal of the transistor and said second terminal of said one Zener diode, whereby the conduction voltage of the Zener diode which is connected to the (c) means forms the reduced said threshold level.*

*11. A threshold circuit as defined in claim 8, said first load comprising a ringing ocillator, further comprising means interconnecting the (a) and (b) means adapted to disconnect the ringing oscillator from across said line in the event the line voltage drops below a second predetermined level lower than the first predetermined level, at the time causing the dummy load to be reconnected across said line.*

References Cited

The following references, cited by the Examiner, are of record in the patented file of this patent or the original patent.

UNITED STATES PATENTS

| | | | |
|---|---|---|---|
| 3,731,004 | 5/1973 | Cowpland | 179—84 T |
| 3,291,916 | 12/1966 | Jorgensen | 179—84 T |

FOREIGN PATENTS

| | | | |
|---|---|---|---|
| 1,228,672 | 11/1966 | Germany | 179—84 T |

KATHLEEN H. CLAFFY, Primary Examiner

J. A. POPEK, Assistant Examiner